Figure 1:
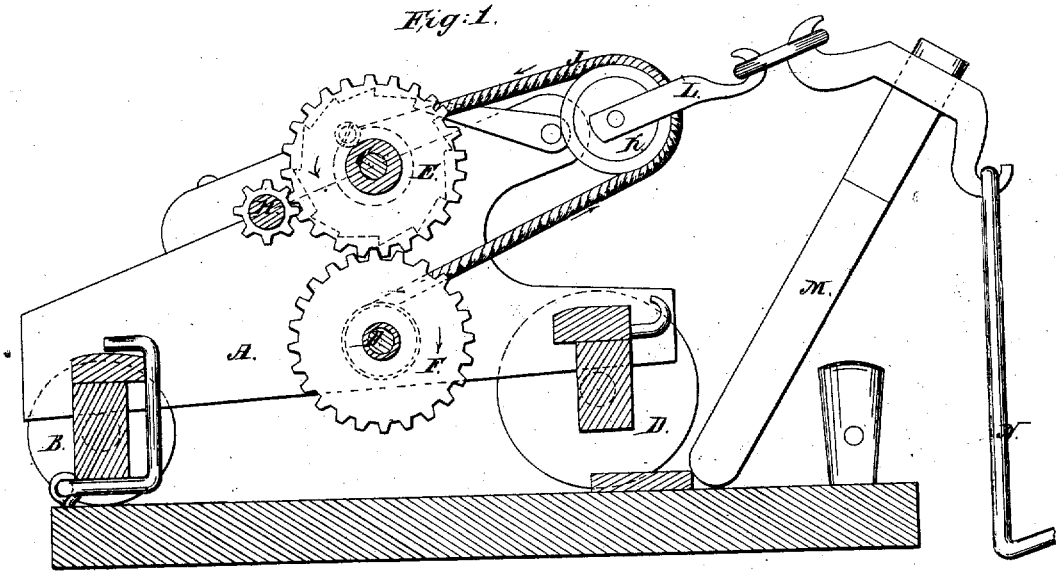

2 Sheets, Sheet 1.

S. W. Ruggles,

Stump Elevator.

No. 3,054. Reissued July 28, 1868.

Witnesses:
C. F. Wilson
Adolf Cluss

Inventors:
Samuel M. Longley
E. J. Genet
Samuel B. Smith
Andrew C. Getty
By their attorney
Z. C. Robbins

N. PETERS, PHOTO-LITHOGRAPHER, WASHINGTON, D. C.

2 Sheets, Sheet 2.
S. W. Ruggles,
Stump Elevator.
No. 3,054. Fig: 2. Reissued July 28, 1868.
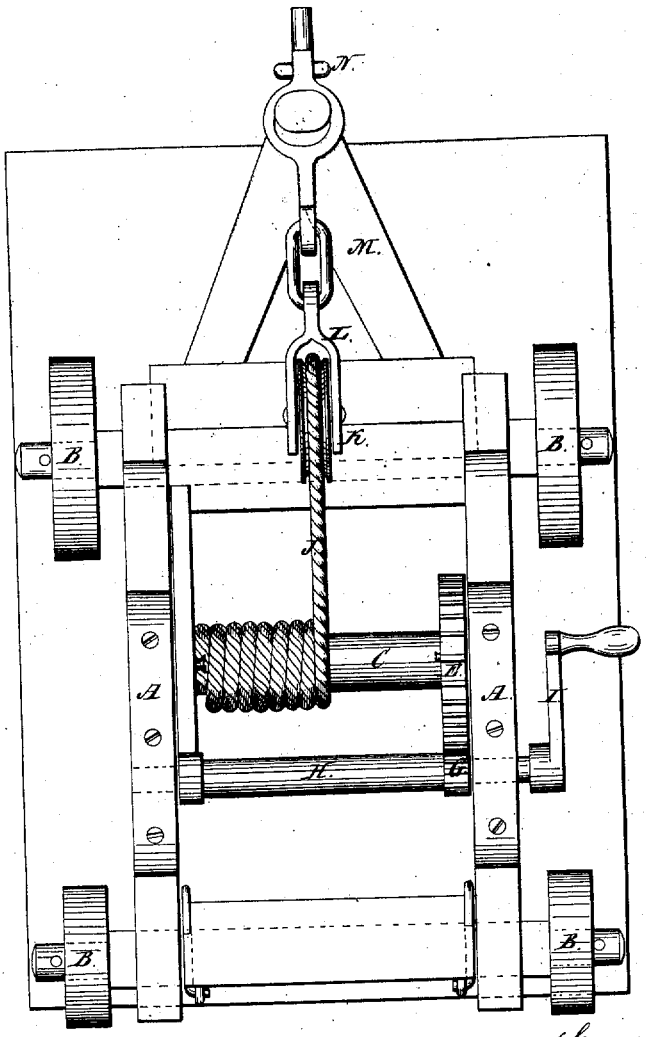
Inventors:
Samuel M. Longley
E. J. Genet
Samuel B. Smith
Andrew C. Getty
By their attorney
Z. C. Robbins
Witnesses:
C. H. Wilson
Adolf Cluss
N. PETERS, PHOTO-LITHOGRAPHER, WASHINGTON, D. C.

United States Patent Office.

SAMUEL M. LONGLEY AND E. J. GENET, OF NEW YORK, AND SAMUEL B. SMITH AND ANDREW C. GETTY, OF HUDSON, NEW YORK, ASSIGNEES, BY MESNE ASSIGNMENTS, OF SOLOMON W. RUGGLES, OF FITCHBURG, MASSACHUSETTS.

*Letters Patent No.* 36,673, *dated October* 14, 1862; *reissue No.* 3,054, *dated July* 28, 1868.

IMPROVED STUMP-EXTRACTOR.

The Schedule referred to in these Letters Patent and making part of the same.

TO ALL WHOM IT MAY CONCERN:

Be it known that on the 14th day of October, 1862, Letters Patent of the United States were issued to SOLOMON W. RUGGLES, of Fitchburg, Massachusetts, for what he termed an "Improved Stump-Extractor," but which he could more properly have entitled an improved differential windlass for stump-extracting and other purposes; and we, the sole assignees and owners of the said patented invention, do hereby declare that the following is a full and exact description thereof, reference being had to the accompanying drawings which form a portion of this specification.

The multiplication of power in this windlass is produced by the combined action of three different principles of leverage, viz, power-multiplying toothed wheels, wrapping-connected differential drums or pulleys, and the purchase-sheave block.

The differential drums or pulleys may be placed side by side upon the same shaft, or may be placed on separate shafts, provided the said shafts be so geared together as to move harmoniously with each other. Ropes or chains may be employed for connecting the differential drums or pulleys with each other and with the lifting-sheave block, but the latter are generally preferred.

When this said improved differential windlass is to be used for stump-extracting, or other similar purpose, it may be constructed in the manner represented in figs. 1 and 2 of the accompanying drawings—.

Figure 1 being a longitudinal vertical section, and

Figure 2 a plan or top view of the same.

The strong frame A, mounted on the wheels B B B B, forms the bearings for the two differential drum-shafts C D, which are geared to each other by equal-sized toothed wheels E F. The driving-shaft H is geared to the toothed wheel E by means of the pinion G.

Power may be applied to the driving-shaft H, through the medium of a crank, or any other suitable device. One end of the wrapping-connector J is secured to the drum-shaft C, and after being passed around the sheave K, in the block L, its opposite end is secured to the drum-shaft D, and in such a manner that the rotation of said drum-shafts will wind the connector upon one of said shafts as it is unwound from the other, and *vice versa*. The winding of the said connector J upon the larger drum-shaft more rapidly than it is unwound from the smaller drum-shaft, imparts a slow but powerful leverage movement to the drawing or lifting-sheave block L.

When the machine is to be operated, it is drawn to the side of a stump and properly secured. A strut, M, whose fulcrum-end rests on the machine, and whose upper end is connected to the sheave-block L, is so inclined as to bring the upper end thereof over the stump to be raised. The said upper end of the strut M is then connected to the stump by any suitable contrivance, and a sufficient amount of power is exerted upon the shaft H to produce the desired result.

When the leverage-power of the said improved differential windlass is to be employed for drawing purposes, or for the raising and lowering of detached bodies, the strut M may be dispensed with.

What is claimed as the invention of SOLOMON W. RUGGLES in the afore-described improved differential windlass, is—

The combined use therein of power-multiplying toothed wheels, wrapping-connected differential drums or pulleys, and a sheave-block or blocks, substantially in the manner and for the respective purposes herein set forth.

In testimony that the aforegoing is a specification of the leverage-machinery for extracting stumps and other purposes, patented by SOLOMON W. RUGGLES, October 14, 1862, accompanying our application for a reissue of said patent, we hereunto sign our names.

SAMUEL B. SMITH. [L. S.]
E. J. GENET. [L. S.]
SAMUEL M. LONGLEY. [L. S.]
ANDREW C. GETTY. [L. S.]

Witnesses:
H. KELLEY,
Z. PLATT.